(12) United States Patent
Honma et al.

(10) Patent No.: US 10,193,152 B2
(45) Date of Patent: Jan. 29, 2019

(54) CATHODE ACTIVE MATERIAL PARTICLES, LITHIUM ION BATTERY PREPARED BY USING THE CATHODE ACTIVE MATERIAL PARTICLES, AND METHOD OF PREPARING THE CATHODE ACTIVE MATERIAL PARTICLES

(71) Applicants: Samsung Electronics Co., Ltd., Suwon-si, Gyeonggi-do (KR); TOHOKU TECHNO ARCH CO., LTD., Sendai-shi, Miyagi (JP)

(72) Inventors: Itaru Honma, Sendai (JP); Murukanahally Kempaiah Devaraju, Sendai (JP); Yuichi Aihara, Yokohama (JP); Seitaro Ito, Yokohama (JP)

(73) Assignees: SAMSUNG ELECTRONICS CO., LTD., Gyeonggi-Do (KR); TOHOKU TECHNO ARCH CO., LTD., Sendai-Shi, Miyagi (JP)

(\*) Notice: Subject to any disclaimer, the term of this patent is extended or adjusted under 35 U.S.C. 154(b) by 313 days.

(21) Appl. No.: 15/260,540

(22) Filed: Sep. 9, 2016

(65) Prior Publication Data
US 2017/0069912 A1 Mar. 9, 2017

(30) Foreign Application Priority Data

Sep. 9, 2015 (JP) .................. 2015-177397
Sep. 11, 2015 (JP) .................. 2015-179886
Dec. 29, 2015 (KR) .............. 10-2015-0188906

(51) Int. Cl.
*H01M 4/525* (2010.01)
*H01M 10/0525* (2010.01)
*C01G 53/00* (2006.01)

(52) U.S. Cl.
CPC ............ *H01M 4/525* (2013.01); *C01G 53/54* (2013.01); *H01M 10/0525* (2013.01);
(Continued)

(58) Field of Classification Search
CPC .... H01M 4/525; H01M 10/0525; H01M 4/04; H01M 4/131; H01M 4/1391;
(Continued)

(56) References Cited

U.S. PATENT DOCUMENTS 5,955,051 A * 9/1999 Li .................. H01M 4/525
                                                    423/594.4
6,287,727 B1 * 9/2001 Horie ................ H01M 4/131
                                                    429/217

(Continued)

FOREIGN PATENT DOCUMENTS

JP       1997219215 A     8/1997
JP       11139831    *    5/1999

(Continued)

OTHER PUBLICATIONS

JP 2013222503 Abstract (Year: 2013).*

(Continued)

*Primary Examiner* — Alexander Usyatinsky
(74) *Attorney, Agent, or Firm* — Cantor Colburn LLP

(57) ABSTRACT

A lithium ion secondary battery including: a cathode including a plurality cathode active material particles; an electrolyte; and an anode, wherein a cathode active material particle of the plurality of cathode active material particles has a plate-shaped crystal structure having an aspect ratio of 2 to 1000, wherein a major surface in at least one direction of the plate-shaped crystal structure is a 111 face, wherein the cathode active material particle also has a spinel-type crystal structure, and wherein the cathode active material (Continued)

particle has a composition represented by the formula $LiCo_{2-x}Ni_xO_4$, wherein $0<x<2$.

20 Claims, 5 Drawing Sheets

(52) U.S. Cl.
CPC ...... *C01P 2002/32* (2013.01); *C01P 2002/72* (2013.01); *C01P 2004/04* (2013.01); *C01P 2004/20* (2013.01); *C01P 2004/54* (2013.01); *C01P 2004/62* (2013.01); *C01P 2006/40* (2013.01)

(58) Field of Classification Search
CPC .. C01G 53/54; C01P 2002/32; C01P 2002/72; C01P 2004/04; C01P 2004/20; C01P 2004/54; C01P 2004/62; C01P 2006/40
See application file for complete search history.

(56) References Cited

U.S. PATENT DOCUMENTS

| | | | |
|---|---|---|---|
| 8,828,605 | B2 | 9/2014 | Lampe-Onnerud |
| 2003/0170541 | A1 | 9/2003 | Yoshio et al. |
| 2010/0159325 | A1* | 6/2010 | Sugiura ............ C01G 53/50 429/223 |
| 2010/0159329 | A1* | 6/2010 | Sugiura ............ H01M 4/131 429/231.4 |
| 2010/0176337 | A1* | 7/2010 | Zhamu ............. H01M 4/1391 252/182.1 |
| 2011/0117417 | A1 | 5/2011 | Pitts |
| 2011/0311435 | A1* | 12/2011 | Yura ............... C01G 45/1242 423/599 |
| 2013/0045424 | A1* | 2/2013 | Sugiura ............ C01G 45/1228 429/231.8 |
| 2015/0140444 | A1 | 5/2015 | DuBois et al. |

FOREIGN PATENT DOCUMENTS

| | | | |
|---|---|---|---|
| JP | 1999189419 | A | 7/1999 |
| JP | 1999307097 | A | 11/1999 |
| JP | 200030709 | A | 1/2000 |
| JP | 2000058057 | A | 2/2000 |
| JP | 2000067864 | A | 3/2000 |
| JP | 2001319647 | A | 11/2001 |
| JP | 2002216761 | A | 8/2002 |
| JP | 2004071518 | A | 3/2004 |
| JP | 2005251713 | A | 9/2005 |
| JP | 2008525973 | A | 7/2008 |
| JP | 2009199798 | A * | 3/2009 |
| JP | 2009541938 | A | 11/2009 |
| JP | 4458232 | B2 | 2/2010 |
| JP | 2011081926 | A | 4/2011 |
| JP | 201153895 | A | 4/2011 |
| JP | 2011091052 | A | 5/2011 |
| JP | 2012199025 | A | 10/2012 |
| JP | 2013222503 | * | 10/2013 |
| JP | 2014525667 | A | 9/2014 |
| JP | 2014192142 | A | 10/2014 |
| JP | 2014192143 | A | 10/2014 |
| JP | 2015046237 | A | 3/2015 |
| JP | 2015046281 | A | 3/2015 |
| JP | 2015046282 | A | 3/2015 |
| JP | 2015046283 | A | 3/2015 |
| JP | 2015046285 | A | 3/2015 |

OTHER PUBLICATIONS

JP 2009199798 Abstract and claims (Year: 2009).*
JP2013222503 MT (Year: 2013).*
Manthimm et all Electrochemical Society Proceedings, 2001, p. 24-32 (Year: 2001).*
Bhattacharya et all Journal of The Electrochemical Society, 161 (9) A1440-A1446 (2014) (Year: 2014).*
Chebiam et all Journal of the Electrochemical Society, 148 (1) A49-A53 (2001) (Year: 2001).*
JP 11139831 Abstract (year 1999).*
Jishnu Bhattacharya et al., Prediction of Quaternary Spinel Oxides as Li-Battery Cathodes: Cation Site Preference, Metal Mixing, Voltage and Phase Stability, Journal of the Electrochemical Society, 2014, pp. A1440-A1446, 161 (9).
NCHU Institutional Repository CRIS, Characterization of LiCo2—xNixO4 Prepared for Cathode Materials in Thin Flim Lithium-Ion Secondary Batteries, http://hdl.handle.net/11455/10965, 2002, 8 pages, DSpace.

* cited by examiner

CATHODE ACTIVE MATERIAL PARTICLES, LITHIUM ION BATTERY PREPARED BY USING THE CATHODE ACTIVE MATERIAL PARTICLES, AND METHOD OF PREPARING THE CATHODE ACTIVE MATERIAL PARTICLES

CROSS-REFERENCE TO RELATED APPLICATIONS

This application claims the benefit of and priority to Japanese Patent Application No. 2015-177397, filed on Sep. 9, 2015, Japanese Patent Application No. 2015-179886, filed on Sep. 11, 2015 in the Japanese Intellectual Property Office, and Korean Patent Application No. 10-2015-0188906, filed on Dec. 29, 2015, in the Korean Intellectual Property Office, and all benefits accruing therefrom under 35 U.S.C. §119, the contents of which are incorporated herein in their entirety by reference.

BACKGROUND

1. Field

The present disclosure relates to a lithium ion secondary battery, cathode active material particles, and a method of preparing cathode active material particles.

2. Description of the Related Art

Spinel-type materials are known as cathode active materials for lithium ion secondary batteries. However, the spinel-type material exhibiting a practical capacity that is useful for secondary batteries is limited to manganese-containing materials or a partial substitution product of the manganese-containing materials.

For example, Japanese Patent Publication No. 2012-199025 discloses a lithium ion secondary battery using a lithium manganese composite oxide (e.g., $LiMn_2O_4$) as a cathode active material and carbonaceous particulates as an anode active material. Japanese Patent Publication No. 2011-81926 discloses a method of preparing a cathode active material formed using $LiMn_2O_4$ and other manganese-containing metal oxides. Thus there remains a need for an improved cathode active material.

SUMMARY

Among materials used herein, a spinel-type material exhibiting a practical capacity when included in a battery has been limited to a manganese-containing materials and partial substitution products of the manganese-containing materials.

Provided is a lithium ion secondary battery including a lithium cobalt-based spinel-type cathode active material with improved discharge capacity and a cathode including the cathode active material.

According to an aspect of an embodiment, a lithium ion secondary battery including: a cathode including a plurality of cathode active material particles; an electrolyte; and an anode, wherein a cathode active material particle of the plurality of cathode active material particles has a plate-shaped crystal structure having an aspect ratio of 2 to 1000, wherein a major surface in at least one direction of the plate-shaped crystal structure is a 111 face, wherein the cathode active material particle also has a spinel-type crystal structure, and wherein the cathode active material particle has a composition represented by the formula $LiCo_{2-x}Ni_xO_4$, wherein $0<x<2$.

According to an aspect of an embodiment, a plurality of cathode active material particles including a plate-shaped crystal structure having an aspect ratio of 2 to 1000, wherein a major surface of the plurality of cathode active material particles includes a 111 face, wherein the plurality of cathode active material particles includes a spinel-type crystal structure, and wherein the plurality of cathode active material particles includes a composition represented by the formula $LiCo_{2-x}Ni_xO_4$, wherein $0<x<2$.

According to an aspect of an embodiment, a method of preparing a plurality of cathode active material particles including: contacting a cobalt-containing material, a nickel-containing material, and a lithium-containing material in a supercritical fluid to produce a metal composite oxide including cobalt, nickel, and lithium; and heat-treating the metal composite oxide and the lithium-containing material to prepare the plurality of cathode active material particles, wherein a cathode active material particle of the plurality of cathode active material particles has a plate-shaped crystal structure having an aspect ratio of 2 to 1000, wherein a major surface in at least one direction of the plate-shaped crystal structure is a 111 face, wherein the cathode active material particle also has a spinel-type crystal structure, and wherein the cathode active material particle has a composition represented by the formula $LiCo_{2-x}Ni_xO_4$, wherein $0<x<2$.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
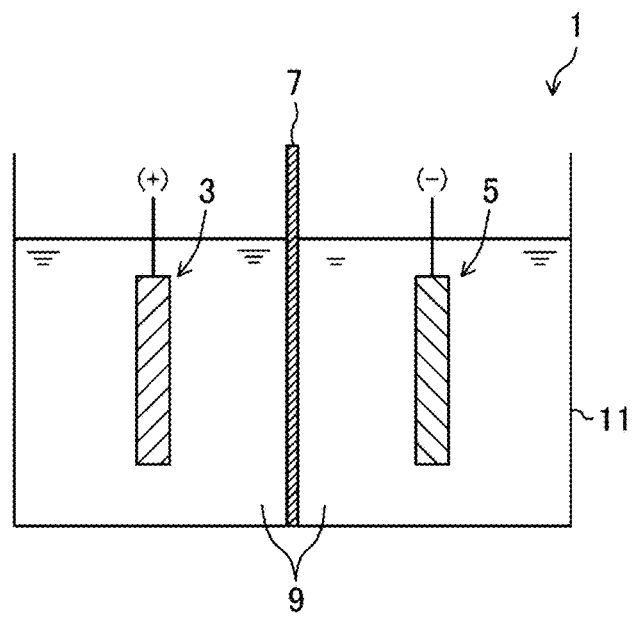
FIG. 1 is a schematic view illustrating the cross section of a lithium ion secondary battery according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. "Or" means "and/or." As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Aspect ratio" as used herein means the average particle width divided by the average particle thickness.

Structures of Cathode Active Material Particles and Lithium Ion Secondary Battery In accordance with an exemplary embodiment, FIG. 1 schematically illustrates a cross-sectional view of a lithium ion secondary battery 1. The structure of a lithium ion secondary battery presented in FIG. 1 is non-limiting, and any suitable structural arrangement is contemplated.

As shown in FIG. 1, the lithium ion secondary battery 1 according to an exemplary embodiment may include a cathode 3 that includes cathode active material particles; an anode 5; an electrolyte 9 that fills the space between the cathode 3 and the anode 5; a separator 7 that is disposed between the cathode 3 and the anode 5 and partitions the electrolyte 9; and a case 11 that accommodates the cathode 3, the anode 5, the separator 7, and the electrolyte 9.

The electrolyte 9 may include any suitable material that elutes lithium ions and may be in a liquid or a gel phase. When the lithium ion secondary battery 1 is a solid state battery, the electrolyte 9 may be a solid. In an exemplary embodiment, a liquid material that forms the electrolyte 9 may include ethylene carbonate (EC) or propylene carbonate (PC), in which a lithium salt is dissolved therein, and examples of a solid material that forms the electrolyte 9 may include a NASICON-type oxide, such as $Li_xAl_yTi_z(PO_4)_3$, $0<x<2$, $0<y<1$, $0<z<3$, a perovskite-type oxide ($La_xLi_yTiO_3$, $0<x<1$, $0<y<1$), or a sulfide solid electrolyte ($Li_3PS_4$, $Li_7P_3S_{11}$, $Li_6PS_5Cl$, or $Li_{10}GeP_2S_{12}$) that is prepared by using $Li_2S-P_2S_5$ as a primary ingredient. Other suitable solid state electrolytes may also be used.

The separator 7 may comprise a material that is permeable to lithium ions and that is not permeable to electrons. In an exemplary embodiment, the material of the separator 7 may include any suitable material such as a microporous membrane including polyethylene or polypropylene and the like.

The anode 5 may include, for example, a current collector including a copper foil; and a mixture of an anode active material and a binder, wherein the current collector is coated with the mixture. In an exemplary embodiment, the anode active material may include a suitable material such as graphite or hard carbon.

The cathode 3 may include a cathode active material in the form of particles. In an exemplary embodiment, the cathode 3 may include a current collector including an aluminum foil and a mixture of cathode active material particles and a binder, wherein the whole current collector is coated with the mixture. Any suitable binder may be used.

The cathode active material particles may have a plate-shaped crystal structure having an aspect ratio of 2 to 1000, and the plate-shaped crystal structure may have a 111 face as a major surface in at least one direction. As used herein, the term "major surface" refers to the two large surfaces of the plate-shaped particle that are opposite each other. A plan view of the crystal structure of the cathode active material is a hexagon.

The cathode active material particles may also have a spinel-type crystal structure.

The cathode active material particles have an elemental composition represented by the formula $LiCo_{2-x}Ni_xO_4$, where, $0<x<2$. That is, the cathode active material particles according to an embodiment may include a material formed by substituting the cobalt of $LiCo_2O_4$ with nickel.

In the cathode active material particles, some of cobalt is substituted with nickel, and thus a theoretical charging/discharging potential and a theoretical capacity may increase. Also, in the cathode active material particles, an exposed area of the 111 face capable of intercalating and deintercalating lithium ions is larger than that of $LiCo_2O_4$ having a cubic-type crystal structure. In this regard, when the cathode active material particles according to an exemplary embodiment are used to prepare a lithium ion secondary battery, a discharge capacity of the lithium ion secondary battery may increase, compared to that of a lithium ion secondary battery having $LiCo_2O_4$ cathode active material particles. Also, when the cathode active material particles are included in a battery, a charging/discharging rate of the battery may be expected to improve.

In the composition represented by the formula $LiCo_{2-x}Ni_xO_4$ of the cathode active material particles, when x satisfies $0<x<2$, a discharge capacity of the lithium ion secondary battery may increase relative to the discharge capacity of a lithium ion secondary battery including $LiCo_2O_4$ cathode active material particles. In an exemplary embodiment where x is in a range of about 0.8 to about 1.2, both the discharge capacity and the charging/discharging potential of the lithium ion secondary battery may increase relative to the discharge capacity of a lithium ion secondary battery including $LiCo_2O_4$ cathode active material particles. In an exemplary embodiment where x is 1, the discharge capacity of the lithium ion secondary battery may increase relative to the discharge capacity of a lithium ion secondary battery including $LiCo_2O_4$ cathode active material particles.

When x is lower than 0.8 in the formula $LiCo_{2-x}Ni_xO_4$, the portion of the cathode active material particles having a cubic structure increases as the value of x decreases (i.e., the portion of the cathode active material particles having a plate-shape decreases). When x is 1.2 or higher in the formula $LiCo_{2-x}Ni_xO_4$, the amounts of both the plate-shape and the spinel-type crystal structures of the cathode active material particles are reduced as the value of x increases. Without being bound by theory, when x is 1 in the formula $LiCo_{2-x}Ni_xO_4$, the discharge capacity of a secondary lithium ion battery including the cathode active material particles may increase because most of the cathode active material particles are plate-shaped.

The average particle diameter of the cathode active material particles is not particularly limited, and any suitably sized particles may be used. In an exemplary embodiment, the average particle diameter of the cathode active material particles is about 1000 nanometers (nm) or less. When the average particle diameter of the cathode active material particles is about 1000 nm or less, the contact area between the cathode active material particles and the liquid electrolyte 9 may increase, and the migration distance for lithium ions to move into an electrode material inside the cathode active material particles may also decrease in comparison with cathode active material particles having an average particle diameter of greater than about 1000 nm. In this regard, the discharge capacity of a lithium ion secondary battery including the cathode active material particles may increase.

When the average particle diameter of the cathode active material particles is about 500 nm or less, the contact area between the cathode active material particles and the liquid electrolyte 9 may further increase. The average particle diameter of the cathode active material particles is measured with a particle size distribution measurement device. In an exemplary embodiment, the average particle diameter may be directly analyzed by observation using a transmission electron microscope (TEM). When the cathode active material particles have a plate shape, the average particle diameter between different cathode active material particles varies in a surface direction and a thickness direction. In an exemplary embodiment, the average particle diameter of the plate-shaped cathode active material particles is measured in the surface direction.

Further, when the average particle diameters of the cathode active material particles are uniform in size, the local differences in the battery characteristics may be reduced. In an exemplary embodiment, the cathode active material may be homogenously dispersed and coated on a current collector.

The cathode including the cathode active material particles according to an embodiment may be used as a cathode of a lithium ion secondary battery.

A method of preparing the cathode active material particles, according to an embodiment, may be any method that may realize the crystal structure described above, for example, a method using a supercritical fluid, but embodiments are not limited thereto. Any suitable solvent capable of forming a supercritical fluid may be used, including but not limited to ethanol, methanol, propylene, and acetone.

The method using a supercritical fluid may include contacting a cobalt-containing material, a nickel-containing material, and a lithium-containing material in a supercritical fluid to produce a metal composite oxide including cobalt, nickel, and lithium; and heat-treating the metal composite oxide and a lithium-containing material to prepare the cathode active material particles. A cathode active material particle of the cathode active material particles has a plate-shaped crystal structure having an aspect ratio of 2 to 1000. A major surface in at least one direction of the plate-shaped crystal structure may be a 111 face. The plurality of cathode active material particles may further comprise a spinel-type crystal structure. A composition of the cathode active material particles is represented by the formula $LiCo_{2-x}Ni_xO_4$, where $0<x<2$.

The metal composite oxide and the lithium-containing material may be heat-treated, for example, using any suitable method of heat treatment at a temperature of about 250° C. to about 450° C. for about 1 hour. Any suitable cobalt-containing material, nickel-containing material, and lithium-containing material may be used to prepare the cathode active material particles. In an exemplary embodiment, the cobalt-containing material may be a hydrate of cobalt nitrate ($Co(NO_3)_2 \cdot 6H_2O$), and the nickel-containing material may be a hydrate of nickel nitrate ($Ni(NO_3)_2 \cdot 6H_2O$), and the lithium-containing material may be, for example, a hydrate of lithium hydroxide ($LiOH \cdot H_2O$).

In an exemplary embodiment, the supercritical fluid may be obtained within a reaction container at a temperature of about 250° C. to about 500° C. and at a pressure of about 20 megapascals (MPa) to about 50 MPa. Any suitable device may be used to form the supercritical fluid.

In an exemplary embodiment, the cathode active material particles prepared with a supercritical fluid may be of a uniform size. In an exemplary embodiment, the cathode active material particles are nanosize.

EXAMPLES

Preparation of Cathode Active Material Particles

The solid hydrates $Co(NO_3)_2 \cdot 6H_2O$, $Ni(NO_3)_2 \cdot 6H_2O$, and $LiOH \cdot H_2O$ were dissolved in ethanol to form a solution having a predetermined concentration, and the solution was mixed at 50° C. with stirring. The final concentrations of the metal species were adjusted so that the cobalt nitrate, the nickel nitrate, and the lithium hydroxide were at a concentration of 0.5 molar (M), 0.5 M, and 3 M, respectively, in ethanol.

The solution was sealed in a container of a device suitable for use in supercritical synthesis (available from AKICO), and the reaction among the metal compounds was performed at a temperature of 300° C. and at a pressure of 10 MPa for 40 minutes. Under such conditions, ethanol, which is the solvent, became a supercritical fluid.

The molar ratio of the cobalt-containing material to the nickel-containing material in the solution was 9:1 in Example 1, 4:1 in Example 2, 7:3 in Example 3, 3:2 in Example 4, 1:1 in Example 5, and 2:3 in Example 6.

A powder was obtained by evaporating the solvent. The powder was then mixed with $LiOH \cdot H_2O$, and heated at 650° C. for 5 hours to obtain the cathode active material particles. The composition of the cathode active material particles represented by the formula $LiCo_{2-x}Ni_xO_4$ was $x=0.2$ in Example 1, $x=0.4$ in Example 2, $x=0.6$ in Example 3, $x=0.8$ in Example 4, $x=1.0$ in Example 5, and $x=1.2$ in Example 6.

Reference Example 1 was prepared by mixing a cobalt nitrate solution and a lithium hydroxide solution without the addition of a nickel nitrate solution in the initial process, The mixture was allowed to react in a supercritical fluid and was subsequently heat-treated in the same manner as in Examples 1 to 6 to prepare cathode active material particles having a composition represented by the formula $LiCo_2O_4$.

The crystal structure of the cathode active material particles prepared in Example 5 was determined using an electron diffraction technique. The crystal structures of the cathode active material particles prepared in Examples 1 to 6 and Reference Example 1, were determined using an X-ray diffraction (XRD) technique. TEM images of the cathode active material particles represent by the formula $LiCo_2O_4$ (Reference Example 1) and the cathode active material particles represented by the formula $LiCo_{1.0}Ni_{1.0}O_4$ (Example 5) were obtained to confirm the appearance and shape of the particles.

Electrochemical Evaluation of Battery

Among the cathode active material particles thus obtained, an evaluation cell including a cathode that includes the cathode active material particles prepared in Reference Example 1, or Example 4 or 5, was prepared. An electrochemical evaluation was then performed on the evaluation cell. The cathode active material particles, acetylene black, and polytetrafluoroethylene (PTFE) were mixed at a weight ratio of 80:10:10 using an agate mortar, and the resultant material was used as the cathode material.

A lithium metal thin film was used as an anode material. In the evaluation cell, each of the cathode active material particles and the anode material was fixed to a metal mesh, and an electrolyte solution (1 M $LiClO_4$ in a solvent mixture of ethylene carbonate (EC) and diethylene carbonate (DEC), where a volume ratio of EC:DEC was 1:1) was sealed in a container. A charging and discharging test was performed on the evaluation cell by charging and discharging the evaluation cell from 4.7 volts (V) to a cut-off voltage of 2.7 V at a current density of 0.1 coulombs (C).

Measurement Results

Figure 2:
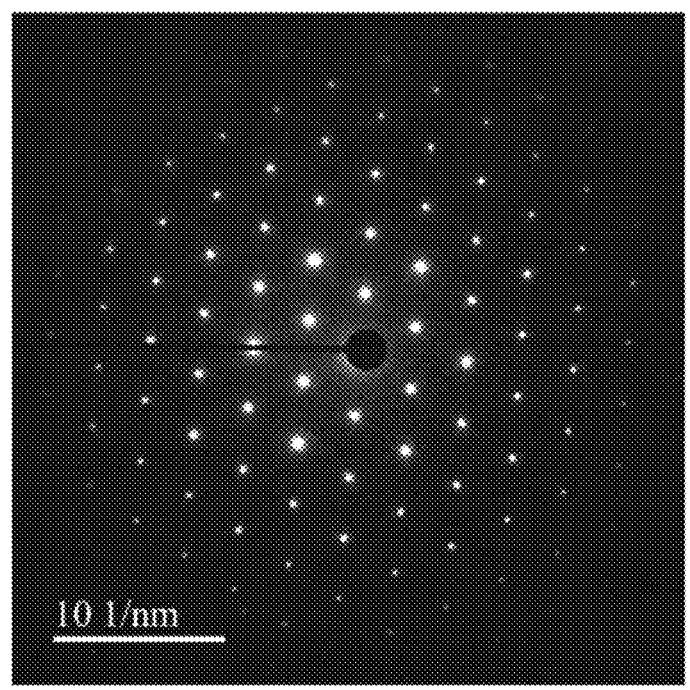
FIG. 2 is an electron diffraction image illustrating an exemplary embodiment of a lithium cobalt nickel composite oxide prepared in accordance with Example 5.

FIG. 2 is an image obtained by electron diffraction of the lithium cobalt nickel composite oxide prepared in Example 5. As shown in FIG. 2, when x is 1.0 in the formula $LiCo_{2-x}Ni_xO_4$, the cathode active material particles had a 6-fold symmetry, and the 6-fold symmetry denoted that a plate surface of the cathode active material particles had a 111 face of a spinel-type crystal structure or a 001 face of layered rock salt crystal structure.

Figure 3:
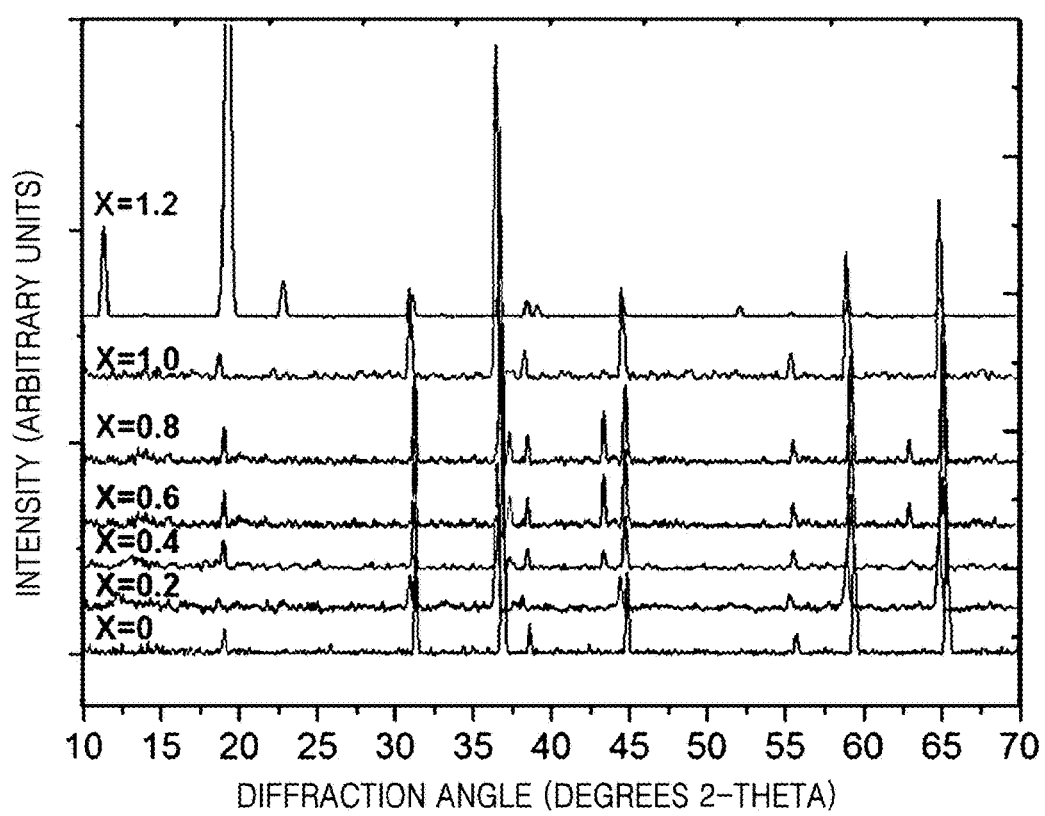
FIG. 3 is an exemplary graph illustrating intensity (arbitrary units) versus diffraction angle (degrees 2-theta) and shows the results of an X-ray diffraction (XRD) technique performed on cathode active material particles prepared in Examples 1 to 6 and Reference Example 1.

FIG. 3 shows the results of XRD measurements that were made with the cathode active material particles prepared in Examples 1 to 6 and Reference Example 1. As shown in FIG. 3, when x is between 0 to 1.2 in the formula $LiCo_{2-x}Ni_xO_4$, peaks were observed within a general diffraction angle range (the horizontal axis in FIG. 3). It was determined that the cathode active material particles had a spinel-type crystal structure when x is between 0 to 1.2 in the formula $LiCo_{2-x}Ni_xO_4$. The cathode active material particles represented by the formula $LiCo_{0.8}Ni_{1.2}O_4$ had an increased peak intensity at a region where the diffraction angle (2 theta) was about 20°, and thus it was confirmed that the crystal structure of the cathode active material particles represented by the formula $LiCo_{0.8}Ni_{1.2}O_4$ was different than the crystal structure of the cathode active material particles when x was less than 1.2 in the formula $LiCo_{2-x}Ni_xO_4$.

In view of the combined results of FIG. 2 and FIG. 3, it was confirmed that a plate surface of the lithium cobalt nickel composite oxide (i.e., cathode active material particles) prepared in Example 5 had a major surface with a 111 face and a spinel-type crystal structure.

Figure 4:
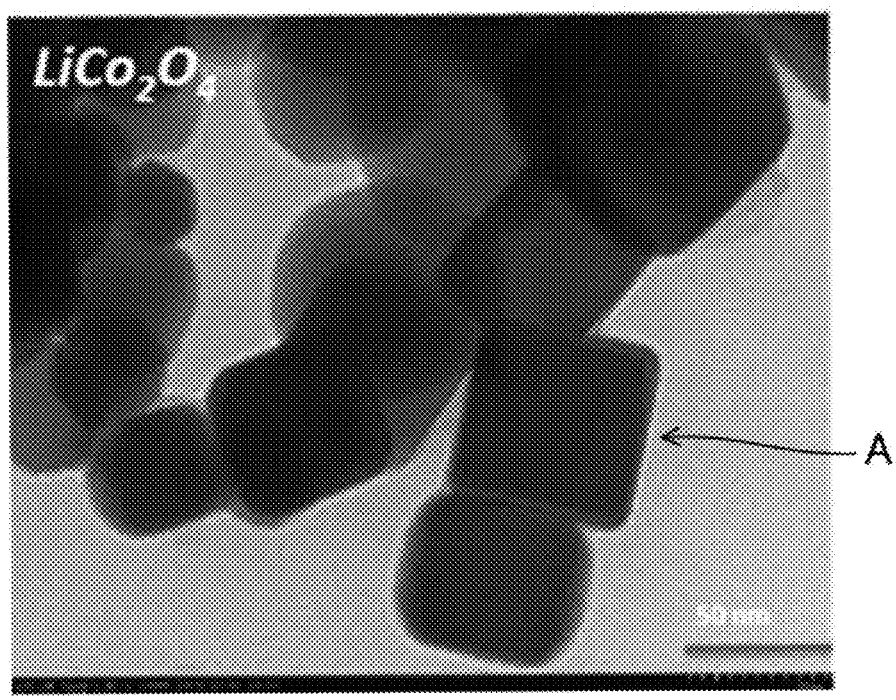
FIG. 4 is an transmission electron microscope (TEM) image of a lithium cobalt composite oxide material of an exemplary embodiment prepared in accordance with Reference Example 1.
Figure 5:
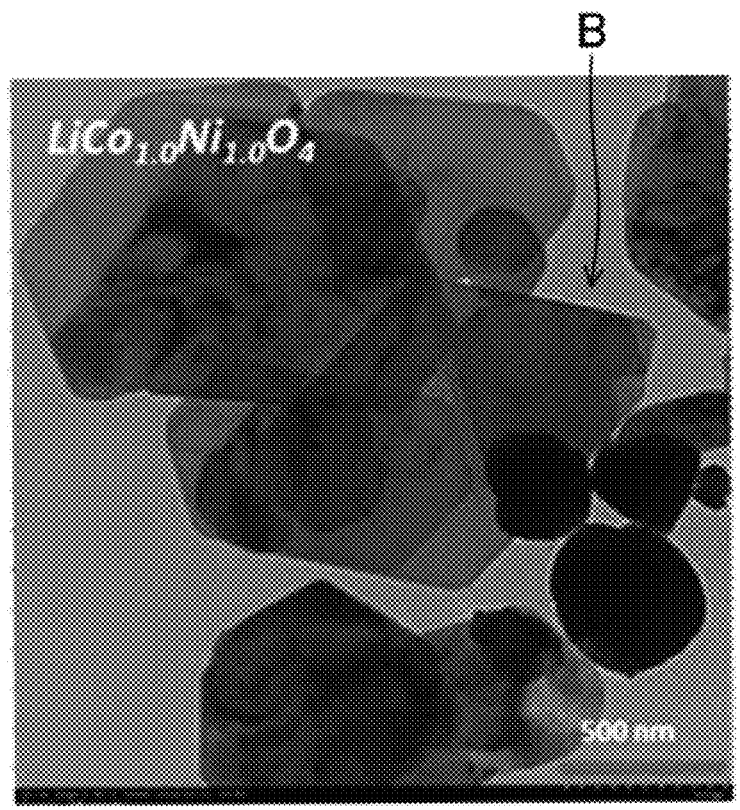
FIG. 5 is an transmission electron microscope (TEM) image of a lithium cobalt nickel composite oxide material of an exemplary embodiment prepared in accordance with Example 5.

FIG. 4 is a TEM image of the lithium cobalt composite oxide prepared in Reference Example 1, and FIG. 5 is a TEM image of the lithium cobalt nickel composite oxide prepared in Example 5.

In view of the TEM image shown in FIG. 4, it may be confirmed that a significant portion of the cathode active material particles having the composition represented by the formula $LiCo_2O_4$ had a cubic crystal structure represented by "A". On the other hand, as shown in FIG. 5, a significant number of the cathode active material particles having a composition represented by the formula $LiCo_{1.0}Ni_{1.0}O_4$ had a hexagonal plate shaped crystal structure represented by "B". The change of a crystal structure from a cubic shape to a plate shape may be caused by addition of nickel.

Figure 6:
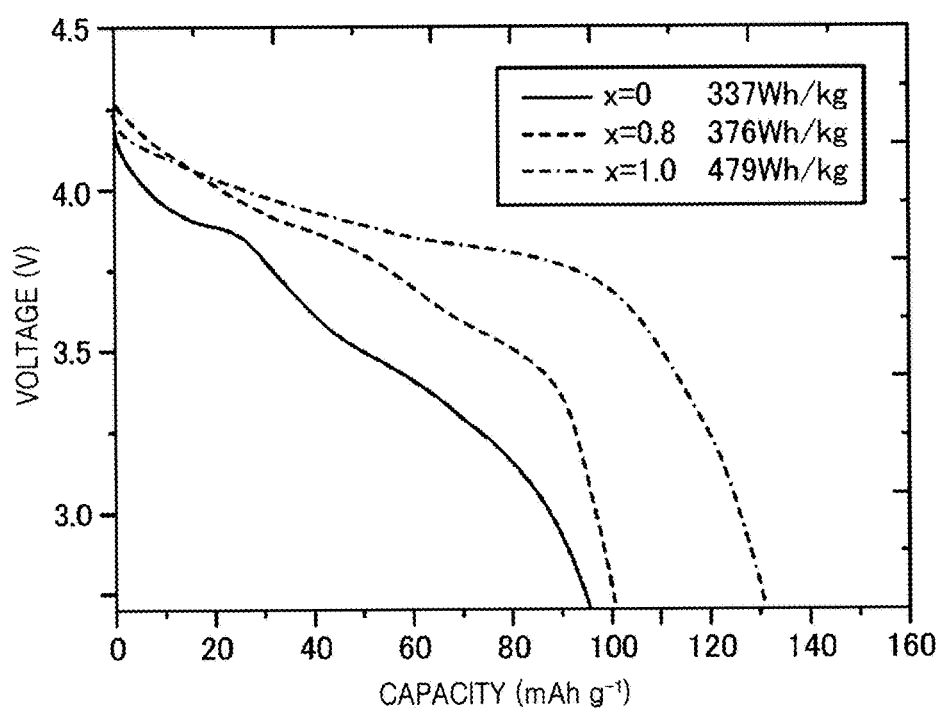
FIG. 6 is a graph of voltage (V) versus capacity (milliamperes hours per gram, mAh $g^{-1}$) and the calculated practical specific energy (watt hours per kilogram, Wh/kg), and illustrates the discharge characteristics of secondary lithium ion batteries including the cathode active materials of the exemplary embodiments prepared in accordance with Examples 4, 5, and Reference Example 1.

FIG. 6 illustrates the discharge characteristics of the secondary lithium ion batteries prepared from the cathode active materials of Examples 4 and 5 and Reference Example 1. As shown in FIG. 6, it may be confirmed that a discharge potential for the secondary lithium ion battery including the cathode active material particles having a composition represented by the formula $LiCo_{0.8}Ni_{1.2}O_4$ was greater than a discharge potential for the secondary lithium ion battery including the cathode active material particles having a composition represented by the formula $LiCo_2O_4$, and that a discharge capacity of the lithium ion secondary battery including the cathode active material particles having a composition represented by the formula $LiCo_{1.0}Ni_{1.0}O_4$ was greater than a discharge capacity of the lithium ion secondary battery including the cathode active material particles having a composition represented by the formula $LiCo_2O_4$. It was also observed that the discharge capacity of the lithium ion secondary battery including the cathode active material particles having a composition represented by the formula $LiCo_{1.0}Ni_{1.0}O_4$ was greater than the discharge capacity of the lithium ion secondary battery including the cathode active material particles having a composition represented by the formula $LiCo_{0.8}Ni_{1.2}O_4$.

As described above, the cathode active material particles according to one or more exemplary embodiments may be used to prepare a cathode for a lithium ion secondary battery or an electrode of a lithium ion capacitor.

When the cathode active material particles are included in a cathode, a discharge capacity of a lithium ion secondary battery including the cathode may increase.

It should be understood that embodiments described herein should be considered in a descriptive sense only and not for purposes of limitation. Descriptions of features or aspects within each embodiment should typically be considered as available for other similar features or aspects in other embodiments.

While an embodiment has been described with reference to the figures, it will be understood by those of ordinary skill in the art that various changes in form and details may be made therein without departing from the spirit and scope as defined by the following claims.

What is claimed is:

1. A lithium ion secondary battery comprising:
   a cathode comprising a plurality of cathode active material particles;
   an electrolyte; and
   an anode,
   wherein a cathode active material particle of the plurality of cathode active material particles has a plate-shaped crystal structure having an aspect ratio of 2 to 1000,
   wherein a major surface in at least one direction of the plate-shaped crystal structure is a 111 face,
   wherein the cathode active material particle also has a spinel-type crystal structure, and
   wherein the cathode active material particle has a composition represented by the formula $LiCo_{2-x}Ni_xO_4$, wherein $0<x<2$.

2. The lithium ion secondary battery of claim 1, wherein x is about 0.8 to about 1.2.

3. The lithium ion secondary battery of claim 2, wherein x is about 1.

4. The lithium ion secondary battery of claim 1, wherein an average particle diameter of the plurality of cathode active material particles is about 1000 nanometers or less.

5. The lithium ion secondary battery of claim 4, wherein the average particle diameter of the plurality of cathode active material particles is about 500 nanometers or less.

6. The lithium ion secondary battery of claim 1, wherein each of the plurality of cathode active material particles has a single crystal structure.

7. The lithium ion secondary battery of claim 6, wherein the plurality of cathode active material particles have the plate-shaped crystal structure having the aspect ratio of 2 to 1000,
   wherein the major surface in at lastone direction of the plate-shaped crystal structure is the 111 face.

8. The lithium ion secondary battery of claim 1, wherein x is about 1.2.

9. A plurality of cathode active material particles, the plurality of cathode active material particles comprising a plate-shaped crystal structure having an aspect ratio of 2 to 1000,
   wherein a major surface in at least one direction of the plate-shaped crystal structure is a 111 face,
   wherein the plurality of cathode active material particles further comprises a spinel-type crystal structure, and
   wherein the plurality of cathode active material particles comprises a composition represented by the formula $LiCo_{2-x}Ni_xO_4$, wherein $0<x<2$.

10. The plurality of cathode active material particles of claim 9, wherein x is about 0.8 to about 1.2.

11. The plurality of cathode active material particles of claim 10, wherein x is about 1.

12. The plurality of cathode active material particles of claim 9, wherein an average particle diameter of the plurality cathode active material particles is about 1000 nanometers or less.

13. The plurality of cathode active material particles of claim 12, wherein an average particle diameter of the plurality of cathode active material particles is about 500 nanometers or less.

14. The plurality of cathode active material particles of claim 9, wherein the plurality of cathode active material particles have a single crystal structure.

15. A method of preparing a plurality of cathode active material particles, the method comprising:
    contacting a cobalt-containing material, a nickel-containing material, and a lithium-containing material in a supercritical fluid to produce a metal composite oxide comprising cobalt, nickel, and lithium; and
    heat-treating the metal composite oxide and the lithium-containing material to prepare the plurality of cathode active material particles,
    wherein a cathode active material particle of the plurality of cathode active material particles has a plate-shaped crystal structure having an aspect ratio of 2 to 1000,
    wherein a major surface in at least one direction of the plate-shaped crystal structure is a 111 face,
    wherein the cathode active material particle also has a spinel-type crystal structure, and
    wherein the cathode active material particle has a composition represented by the formula $LiCo_{2-x}Ni_xO_4$, wherein $0<x<2$.

16. The method of claim 15, wherein x is about 0.8 to about 1.2.

17. The method of claim 16, wherein x is about 1.

18. The method of claim 15, wherein an average particle diameter of the plurality of cathode active material particles is about 1000 nanometers or less.

19. The method of claim 18, wherein an average particle diameter of the plurality of cathode active material particles is about 500 nanometers or less.

20. The method of claim 15, wherein the plurality of cathode active material particles have a single crystal structure.

* * * * *